United States Patent
Ramasubramanian et al.

(10) Patent No.: US 8,865,345 B1
(45) Date of Patent: Oct. 21, 2014

(54) ELECTRODES FOR THREE-DIMENSIONAL LITHIUM BATTERIES AND METHODS OF MANUFACTURING THEREOF

(75) Inventors: Murali Ramasubramanian, Fremont, CA (US); Ashok Lahiri, Cupertino, CA (US)

(73) Assignee: Enovix Corporation, Fremont, CA (US)

( * ) Notice: Subject to any disclaimer, the term of this patent is extended or adjusted under 35 U.S.C. 154(b) by 1938 days.

(21) Appl. No.: 12/013,394

(22) Filed: Jan. 11, 2008

Related U.S. Application Data

(60) Provisional application No. 60/884,836, filed on Jan. 12, 2007, provisional application No. 60/884,828, filed on Jan. 12, 2007.

(51) Int. Cl.
*H01M 4/04* (2006.01)
*H01M 2/02* (2006.01)
*C25D 13/12* (2006.01)

(52) U.S. Cl.
USPC .................. 429/209; 429/218.1; 429/163

(58) Field of Classification Search
CPC ....... H01M 4/134; H01M 4/386; H01M 6/40; H01M 10/0436; H01M 10/04; H01M 10/0472
USPC ...................................... 429/163, 218.1, 209
See application file for complete search history.

(56) References Cited

U.S. PATENT DOCUMENTS

| | | | |
|---|---|---|---|
| 4,820,599 A | 4/1989 | Furukawa et al. | |
| 4,996,129 A | 2/1991 | Tuck | |
| 5,294,504 A | 3/1994 | Otagawa | |
| 5,993,990 A | 11/1999 | Kanto et al. | |
| 6,432,585 B1 | 8/2002 | Kawakami | |
| 6,498,406 B1 | 12/2002 | Horiuchi | |
| 6,878,173 B2 | 4/2005 | Miyahisa | |
| 7,153,609 B2 | 12/2006 | Kubo et al. | |

(Continued)

FOREIGN PATENT DOCUMENTS

| CA | 02388711 A1 | 5/2001 |
|---|---|---|
| JP | 2000-268813 | * 9/2000 |

(Continued)

OTHER PUBLICATIONS

Machine Translation of JP 2000-268813.*

(Continued)

*Primary Examiner* — Milton I Cano
*Assistant Examiner* — Stephen Yanchuk
(74) *Attorney, Agent, or Firm* — Bryan Cave LLP

(57) ABSTRACT

Various methods, systems, and apparatus for implementing aspects of the use of alloy anodes in three-dimensional lithium-ion batteries are disclosed, while accounting for volume change that occurs in these alloy anodes during charging and discharging. A three-dimensional lithium-ion battery according to certain embodiments comprises a battery enclosure, and an anode protruding from a first surface within the enclosure, with the anode having a first state and an expanded state, where the volume occupied by said anode is larger in the expanded state than in the first state. A first cathode is separated from the anode along a first direction, and a second cathode is separated from the anode along a second direction. A separator contacts the first cathode, the second cathode, and a portion of the anode. A gap is provided between the anode and the separator, the gap being larger in the first state than in the expanded state.

30 Claims, 10 Drawing Sheets

(56) References Cited

U.S. PATENT DOCUMENTS

| | | | |
|---|---|---|---|
| 2002/0034685 | A1 | 3/2002 | Sato et al. |
| 2004/0185336 | A1* | 9/2004 | Ito et al. .................. 429/152 |
| 2005/0008939 | A1* | 1/2005 | Ota et al. .................. 429/324 |
| 2006/0154141 | A1 | 7/2006 | Salot et al. |
| 2007/0172732 | A1 | 7/2007 | Jung et al. |
| 2007/0243460 | A1 | 10/2007 | Carlson et al. |
| 2008/0081256 | A1* | 4/2008 | Madou et al. ............. 429/209 |
| 2009/0117472 | A1* | 5/2009 | Iwamoto .................. 429/246 |
| 2009/0170001 | A1* | 7/2009 | Roozeboom et al. ...... 429/225 |
| 2010/0119939 | A1 | 5/2010 | Misumi et al. |
| 2011/0111283 | A1 | 5/2011 | Rust, III et al. |

FOREIGN PATENT DOCUMENTS

| | | | |
|---|---|---|---|
| JP | 2008153033 A | | 7/2008 |
| JP | 2008153034 A | | 7/2008 |
| JP | 2008153035 A | | 7/2008 |
| JP | 2008153036 A | | 7/2008 |
| WO | WO 2006-056964 | * | 6/2006 |
| WO | 2008072638 A1 | | 6/2008 |

OTHER PUBLICATIONS

International Search Authority, PCT International Search Report and Notification of Transmittal, Int'l App. No. PCT/US 08/50942, May 18, 2008.

Chan, High-performance lithium battery anodes using silicon nanowires, Nature Nanotechnology, vol. 3, pp. 31-35, Jan. 2008.

Serpo, A tenfold improvement in battery life?, ZDNet News, Jan. 15, 2008.

Long et. al., "Three-Dimensional Battery Architectures," Chemical Reviews, (2004), 104, 4463-4492.

Chang Liu, Foundations of MEMS, Chapter 10, pp. 1-55 (2006).

Kanamura et. al., "Electrophoretic Fabrication of LiCoO2 Positive Electrodes for Rechargeable Lithium Batteries," J. Power Sources, 97-98 (2001) 294-297.

Caballero et al., "LiNi0.5Mn1.5O4 thick-film electrodes prepared by electrophoretic deposition for use in high voltage lithium-ion batteries," J. Power Sources, 156 (2006) 583.

Wang and Cao, "Li+-intercalation Electrochemical/chromic Props of Vanadium Pentoxide Films by Sol Electrophoretic Deposition," Electrochimica Acta, 51, (2006), 4865-4872.

Nishizawa et al., "Template Synth of Polypyrrole-Coated Spinel LiMn2O4 Nanotubules and Props as Cathode Active Materials for Li Batteries," J.Electrochem.Soc., 1923-1927(1997).

Shembel et. al., "Thin Layer Electrolytic Molybdenum Oxysulfides for Li Secondary Batteries With Liquid and Polymer Electrolytes," 5th Adv Batteries and Accumulators (2004).

Kobrin et. al., "Molecular Vapor Deposition—An Improved Vapor-Phase Deposition Technique of Molecular Coatings for MEMS Devices," SEMI Tech Symp:(STS,ISM), 2004.

Green et al., "Structured Silicon Anodes for Li Battery Applications," Electrochem & Solid State Letters, 6, 2003 A75-A79.

Shin et al., "Porous Silicon Negative Electrodes for Rechargeable Lithium Batteries," J. Power Sources, 139 (2005) 314-320.

Broussely and Archdale, "Li-ion batteries and portable power source prospects for the next 5-10 years," J. Power Sources, 136, (2004), 386-394.

V. Lehmann, "The Physics of Macropore Formation in Low Doped n-Type Silicon," J. Electrochem. Soc. 140 (1993), 10, 2836-2843.

Vyatkin et al., "Random and Ordered Macropore Formation in p-Type Silicon," J. Electrochem. Soc. 149, 1, G70-G76 (2002).

van den Meerakker et al., "Etching of Deep Macropores in 6 in. Si Wafers," J. Electrochem. Soc. 147, 7, 2757-2761 (2000).

P.G. Balakrishnan, R. Ramesh, and T. Prem Kumar, "Safety mechanisms in lithium-ion batteries," Journal of Power Sources, 2006, 155, 401-414.

P. Arora and Z. Zhang, "Battery separators," Chem. Rev., 2004, 104, 4419-4462.

* cited by examiner

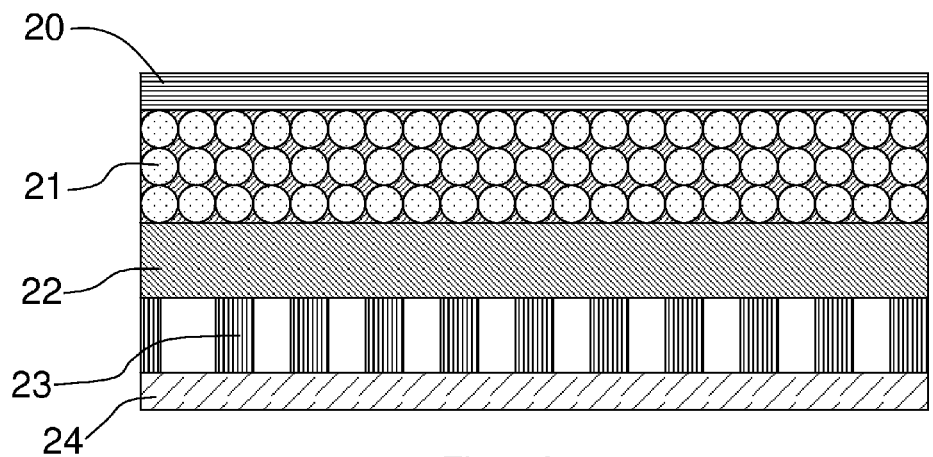
Fig. 2A  *PRIOR ART*
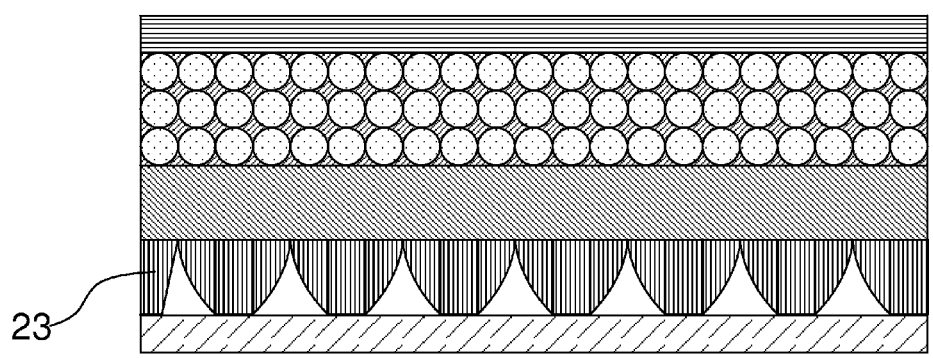
Fig. 2B  *PRIOR ART*

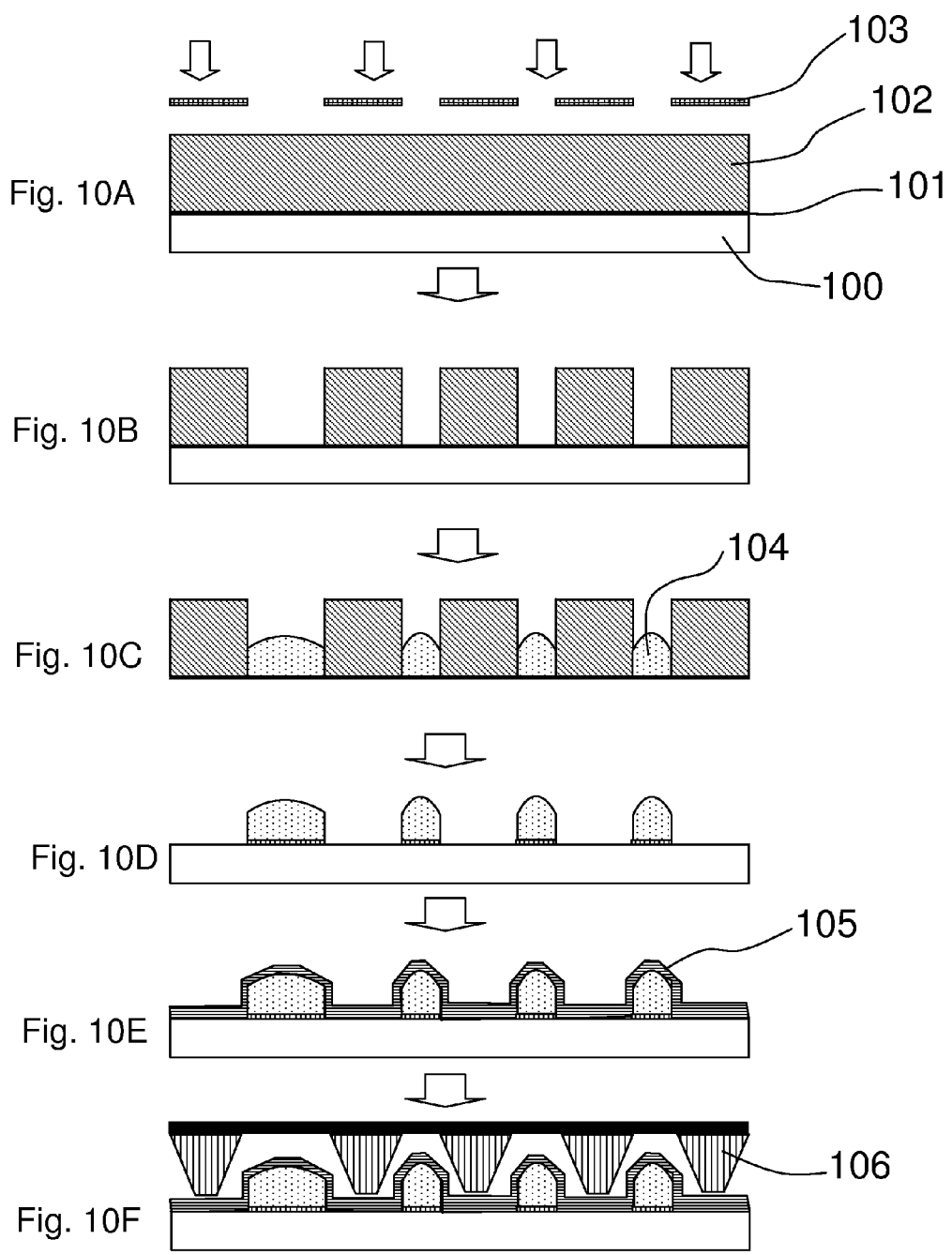

ELECTRODES FOR THREE-DIMENSIONAL LITHIUM BATTERIES AND METHODS OF MANUFACTURING THEREOF

CROSS-REFERENCE TO RELATED APPLICATIONS

This application claims priority under 35 U.S.C. section 119(e) to U.S. Provisional Application No. 60/884,836, entitled "Electrodes For Three Dimensional Lithium Batteries And Methods Of Manufacturing Thereof," filed on Jan. 12, 2007, and U.S. Provisional Application No. 60/884,828, entitled "Three-Dimensional Batteries and Methods of Manufacturing Using Backbone Structure," filed on Jan. 12, 2007, both of which are hereby incorporated by reference herein in their entirety.

BACKGROUND OF THE INVENTION

1. Field of the Invention

Implementations consistent with the principles of the invention generally relate to the field of battery technology, more specifically to electrodes, such as anodes or negative electrodes, for three-dimensional lithium batteries and their methods of manufacture.

2. Background

Existing energy storage devices, such as batteries, fuel cells, and electrochemical capacitors, typically have planar architectures with an actual surface area of each component being roughly equivalent to a geometrical area, with a porosity being responsible for any area increase over the geometrical area. Energy storage devices such as lithium batteries are the state of the art power sources for many electronic devices due to their high energy density, high power, and long shelf life.

FIG. 1 shows a cross sectional view of an existing energy storage device, such as a lithium-ion battery. The battery 15 includes a cathode current collector 10, on top of which a cathode 11 is assembled. This layer is covered by a separator 12, over which an assembly of an anode current collector 13 and an anode 14 are placed. This stack is then sometimes covered with another separator layer (not shown) above the anode current collector 13, and is then rolled and stuffed into a can to assemble the battery 15. During a charging process, lithium leaves the cathode 11 and travels through the separator 12 as a lithium ion into the anode 14. Depending on the anode 14 used, the lithium ion either intercalates (e.g., sits in a matrix of an anode material without forming an alloy) or forms an alloy. During a discharge process, the lithium leaves the anode 14, travels through the separator 12 and passes through to the cathode 11.

Anodes for lithium ion batteries generally fall into two categories: 1) anodes that hold lithium within a material matrix, which are referred to as intercalation anodes; and 2) anodes that form an alloy in the presence of lithium, which are referred to as alloy anodes. Carbon is an example of a material for forming intercalation anodes, while aluminum, silicon, and tin are examples of materials for forming alloy anodes.

In the process of formation of a Li—X alloy (where X is a material that can form an alloy with lithium), there can be a significant volume difference between an alloyed and an un-alloyed state. In particular, the alloyed state can occupy a significantly greater volume than the un-alloyed state. In other words, alloy anodes can change volume by a significant fraction during every charge-discharge cycle. This can pose a significant problem for the stability and cycle life of the anodes when incorporated into batteries. In particular, alloy anodes can have capacity loss by way of cracks that are formed during volume change. During repeated cycling, these cracks can propagate and cause parts of an anode material to separate from a matrix. This can cause a decrease in the amount of the anode material that is electrically connected to a current collector, thereby causing capacity loss. In some instances, the volume change in alloy anodes can be as high as 300%. Certain methods have been proposed to overcome the problems of capacity loss due to expansion and contraction of alloy anodes. Unfortunately, these methods suffer from a number of deficiencies, and often involve a traditional planar architecture for a battery.

Three-dimensional batteries have been proposed in the literature as ways to improve battery capacity and active material utilization. It has been proposed that a three-dimensional architecture can be used to provide higher surface area and higher energy as compared to a two-dimensional, flat battery architecture.

FIG. 2A illustrates one possible design for a structured silicon anode that is assembled into a lithium-ion battery with a planar cathode in a discharged state, as has been proposed in the literature. For example, reference to Green et al., "Structured Silicon Anodes for Lithium Battery Applications," *Electrochemical and Solid State Letters*, 6, 2003 A75-A79, may help to illustrate the state of the art in structured silicon anodes, and is therefore incorporated by reference as non-essential subject matter herein. Referring to FIG. 2A, a cathode sheet including a cathode current collector 20 along with a cathode active porous material 21 is assembled on top of a separator material 22. This dual-layered material is then attached to a structured silicon anode material 23, which is in the form of pillars that are connected to an anode current collector 24. During charging, lithium ion transport occurs from the cathode active material 21 through the separator material 22 into the anode material 23. Since the anode material 23 in this case is made out of silicon, the charging process expands it. As can be seen in FIG. 2B, top portions of the anode material 23, which are geometrically closer to the cathode active material 21 than bottom portions of the anode material 23, experience larger amounts of expansion. This non-uniform expansion can cause a non-uniform current density and, thereby, a non-uniform capacity utilization. This is pictorially shown in FIG. 2B, where the top portions of the anode material 23 are in an expanded state due to preferential alloying. In certain cases, the top portions can close off before the bottom portions can be lithiated.

The following references may also help to illustrate the state of the art, and are therefore incorporated by reference as non-essential subject matter herein: Shin et al., "Porous Silicon Negative Electrodes For Rechargeable Lithium Batteries," *Journal of Power Sources*, 139 (2005) 314-320; Long et. al., "Three-Dimensional Battery Architectures," *Chemical Reviews*, (2004), 104, 4463-4492; Broussely and Archdale, "Li-ion batteries and portable power source prospects for the next 5-10 years," *Journal of Power Sources*, 136, (2004), 386-394; Canadian Patent CA 02388711 by Ikeda et al.; Chang Liu, FOUNDATIONS OF MEMS, Chapter 10, pages 1-55 (2006); V. Lehmann, "The Physics of Macropore Formation in Low Doped n-Type Silicon," *J. Electrochem. Soc.* 140 (1993), 10, 2836-2843; Vyatkin et al., "Random and Ordered Macropore Formation in p-Type Silicon," *J. Electrochem. Soc.* 149, 1, G70-G76 (2002); van den Meerakker et al., "Etching of Deep Macropores in 6 in. Si Wafers," *J. Electrochem. Soc.* 147, 7, 2757-2761 (2000); Kanamura et. al., "Electrophoretic Fabrication of LiCoO$_2$ Positive Electrodes for Rechargeable Lithium Batteries," *Journal of Power Sources*, 97-98 (2001) 294-297; Caballero et al., "LiNi$_{0.5}$Mn$_{1.5}$O$_4$ thick-film electrodes prepared by electrophoretic deposition for use in high voltage lithium-ion batteries," *Journal of Power Sources*, 156 (2006) 583-590; Wang and Cao, "Li$^+$-intercalation Electrochemical/Electrochromic Properties Of Vanadium Pentoxide Films By Sol Electrophoretic Deposition," *Electrochimica Acta*, 51, (2006), 4865-4872; Nishizawa et al., "Template Synthesis of Polypyrrole-Coated Spinel LiMn$_2$O$_4$ Nanotubules and Their Properties as Cathode Active Materials for Lithium Batteries," *Journal of the Electrochemical Society*, 1923-1927, (1997); and Shembel et. al., "Thin Layer Electrolytic Molybdenum Oxysulfides For Lithium Secondary Batteries With Liquid And Polymer Electrolytes," 5$^{th}$ *Advanced Batteries and Accumulators*, *ABA*-2004, Lithium Polymer Electrolytes.

It would be desirable to make three-dimensional electrochemical energy devices that may provide higher energy and power density, while reducing capacity loss due to expansion and contraction of alloy anodes and the resulting disintegration (also known as attrition) of anode material.

SUMMARY

Various methods and apparatus relating to electrodes in three-dimensional battery structures are disclosed and claimed. Certain embodiments of the invention relate to electrochemical energy storage systems and devices including anodes that form alloys with lithium. Some embodiments of the invention relate to a battery that can be formed with a wide range of thicknesses, such as from 1 μm to 10,000 μm, and using any of a number of materials that can act as an alloy anode with lithium. This can be achieved by making a structured anode with different methods. In addition, a cathode can also be structured by similar or different methods, and the cathode can extend substantially into a matrix of the anode. In other words, every anode sub-structure can have a corresponding cathode sub-structure that is nearby and is separated by a separator material. This allows for a uniform current distribution and, thereby, uniform expansion of the anode.

A three-dimensional lithium-ion battery according to certain embodiments comprises a battery enclosure, and an anode protruding from a first surface within the enclosure, with the anode having a first state and an expanded state, where the volume occupied by said anode is larger in the expanded state than in the first state. A first cathode is separated from the anode along a first direction, and a second cathode is separated from the anode along a second direction. A separator contacts the first cathode, the second cathode, and a portion of the anode. A gap is provided between the anode and the separator, the gap being larger in the first state than in the expanded state.

Other aspects and advantages of the present invention can be seen upon review of the figures, the detailed description, and the claims that follow.

BRIEF DESCRIPTION OF THE DRAWINGS

The accompanying drawings are for the purpose of illustrating and expounding the features involved in the present invention for a more complete understanding, and not meant to be considered as a limitation:

FIG. 2A is a schematic illustration of a cross-section of a lithium-ion cell in a discharged state that has a structured anode assembled in a planar configuration.

FIG. 2B is a pictorial representation of the configuration of the lithium-ion cell of FIG. 2A, but in a charged state.

FIGS. 10A-10F show another process for assembling a lithium-ion cell where the cathode has been previously structured using a LIGA process, according to an embodiment of the invention.

DETAILED DESCRIPTION

Figure 1:
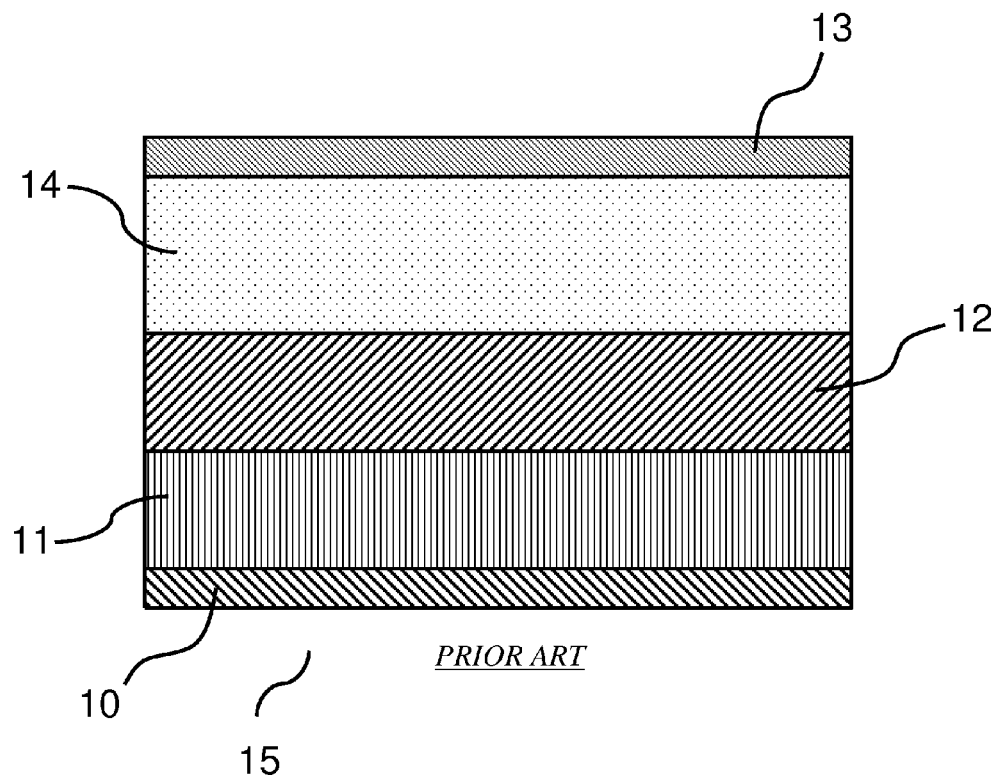
FIG. 1 is a generic cross-section of an existing two-dimensional energy storage device such as a lithium ion battery.
Figure 3A:
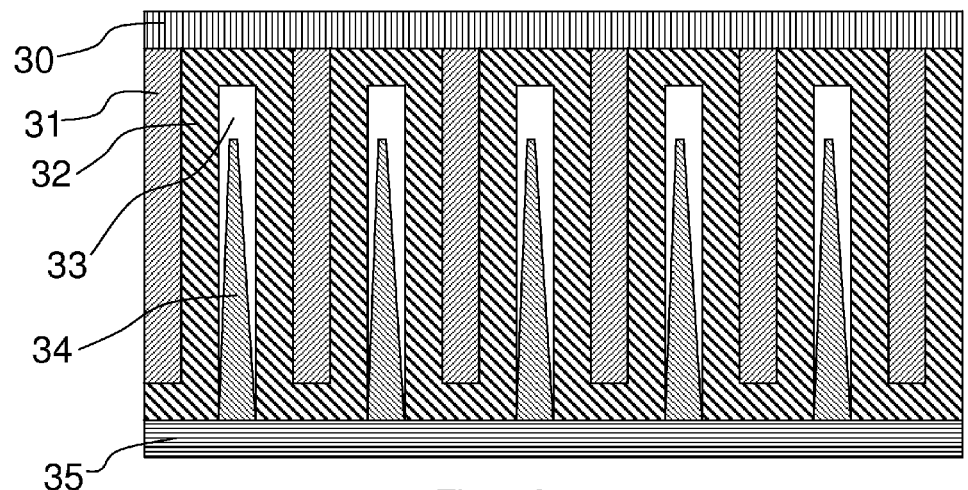
FIG. 3A is a cross-sectional schematic of a lithium-ion battery where an anode is in a discharged (de-lithiated) state, according to an embodiment of the invention.
Figure 3B:
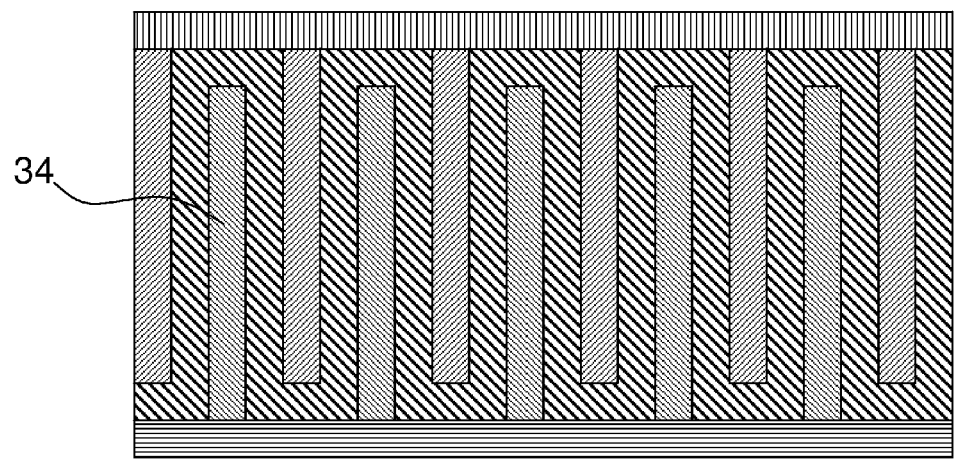
FIG. 3B is a cross-sectional schematic of the lithium-ion battery depicted in FIG. 3A where the anode is in a charged (lithiated) state, according to an embodiment of the invention.
Figure 4A:
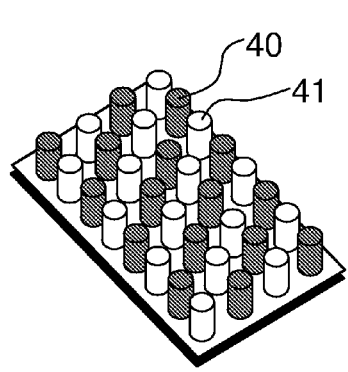
FIG. 4 is a schematic representation of some non-limiting examples of various shapes that anodes can be structured in order to provide relief during volumetric expansion, according to an embodiment of the invention.
Figure 4B:
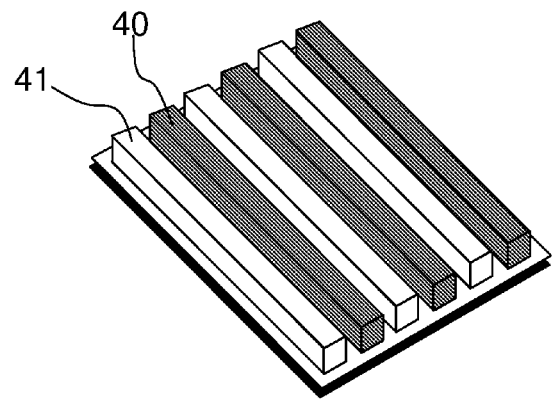
Figure 4C:
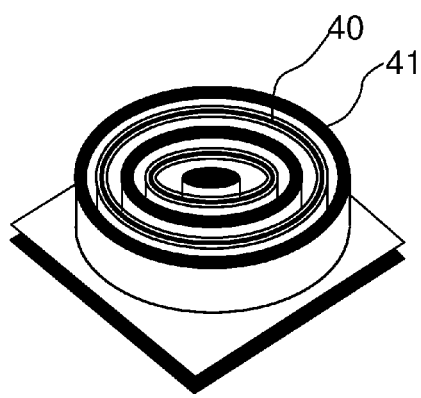
Figure 4D:
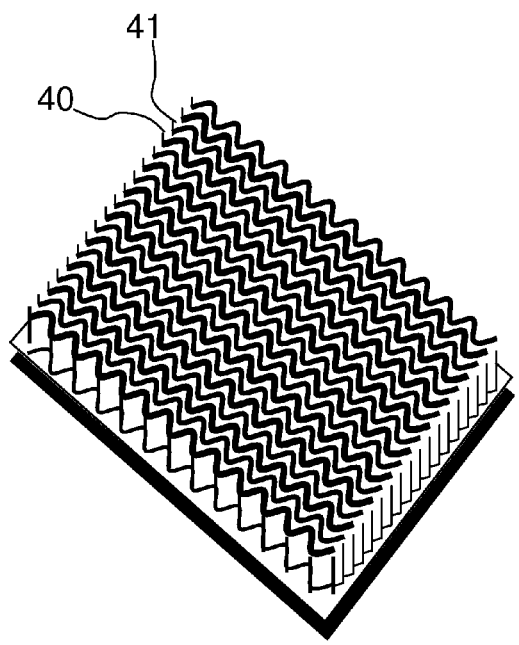

Certain embodiments of the invention relate to the design of a lithium-ion battery. The design in certain embodiments utilizes structured alloy anodes that provide room for expansion and contraction during cycling, thereby mitigating the loss of cycle life and providing a uniform current distribution along a graded structure. FIG. 3A is a cross-sectional schematic of an improved design for a lithium-ion battery in which an anode is in a discharged (de-lithiated) state. The assembly shown includes a cathode current collector 30 on which a cathode material 31 and a separator material 32 are assembled in a three-dimensional fashion. A structured anode material 34 is assembled in gaps 33 and is connected to an anode current collector 35. FIG. 3B shows the assembly in a charged state, where expansion from charging of the anode material 34 is accommodated in the gaps 33.

The cathode material 31 and the anode material 34 can be assembled in any three-dimensional fashion. This can include, for example, inter-penetrating pillars, plates, honeycomb structures, waves, spirals, and other configurations where anode structures and cathode structures are in proximity to each other in more than one plane. For example, in FIG. 3A, each anode structure is in close proximity to two cathode structures, one on either side. In structures such as pillars, each electrode could be in proximity to surfaces from more than two counter electrodes. The anode and cathode current collectors 30 and 35 can be separate (top and bottom connection as shown in FIG. 3A) or co-planar.

Some examples of three-dimensional architectures with co-planar cathodes and anodes are shown in FIG. 4. FIG. 4A shows a three-dimensional assembly with cathodes and anodes in the shape of pillars, FIG. 4B shows a three-dimensional assembly with cathodes and anodes in the shape of plates, FIG. 4C shows a three-dimensional assembly with cathodes and anodes in the shape of concentric circles, and FIG. 4D shows a three-dimensional assembly with cathodes and anodes in the shape of waves. In these figures, cathodes 40 and anodes 41 are in the same plane and are alternating in a periodic fashion. Also, in these figures, a first cathode is separated from an anode along a first direction, and a second cathode is separated from the anode along a second direction. A separator (not shown in FIGS. 4A-4D) contacts the first cathode, the second cathode, and a portion of the anode. A gap is provided between the anode and the separator, the gap being larger in the first state than in the expanded state.

Referring back to FIG. 3A and FIG. 3B, since the anode and cathode structures are in proximity to each other in more than one plane, expanding alloy anode structures can undergo more uniform expansion in this architecture. For each anode pillar shown in FIG. 3A, lithium ions are transported into the anode pillar from multiple sides that have the cathode material 31 nearby. This causes transport of lithium from different directions, thereby causing more uniform expansion than in the case of the design of FIG. 2. In order to accommodate the increase in volume, the gaps 33 in the structure shown in FIGS. 3A and 3B can be designed judiciously along a height dimension. Referring to FIG. 3B, connection points from the anode structures to the anode current collector 35 undergo little or no expansion. The illustrated design also improves cycle life of the battery by optimizing ion transport lengths along the three-dimensional structure. Therefore, each ion has a higher probability of cycling back and forth at the same geometrical spot in the structure in order to minimize or reduce transport lengths, and this increases cycle life.

Figure 5A:
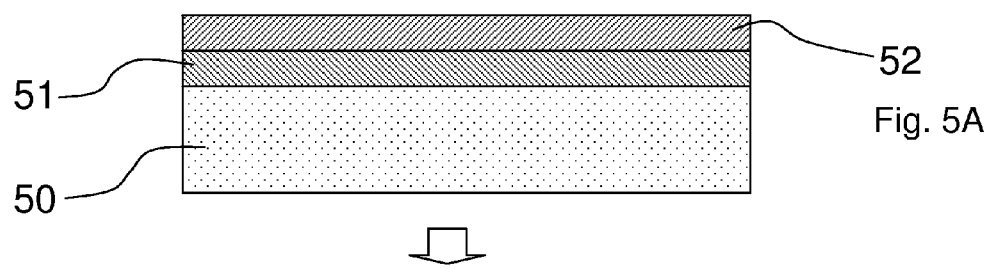
FIGS. 5A-5E depict a schematic representation of a subtractive process for obtaining a graded anode using a reactive ion etch process, according to an embodiment of the invention.
Figure 5B:
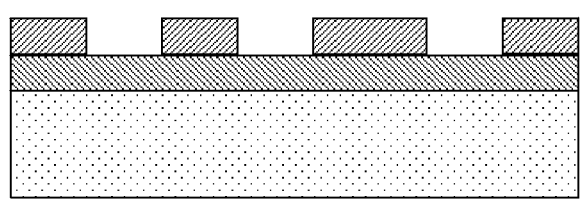
Figure 5C:
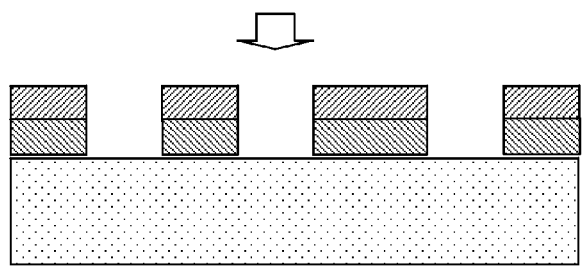
Figure 5D:
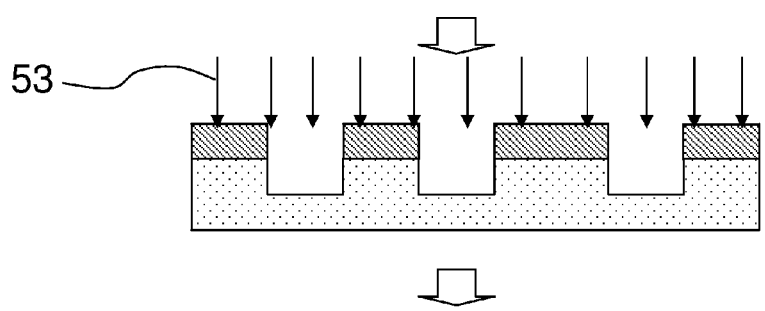
Figure 5E:
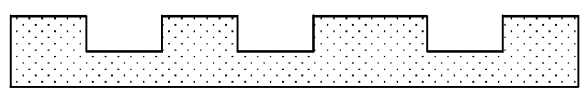
Figure 6A:
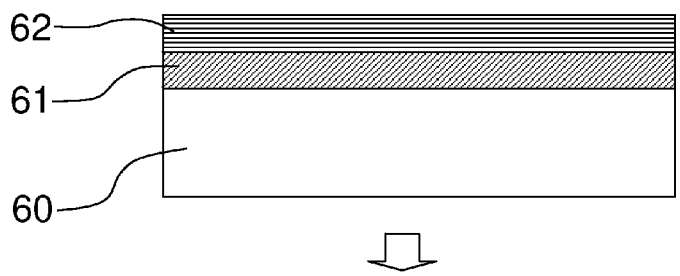
FIGS. 6A-6D depict a schematic representation of a subtractive process for obtaining a graded anode using an electrochemical etch process, according to an embodiment of the invention.
Figure 6B:
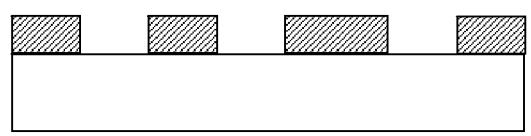
Figure 6C:
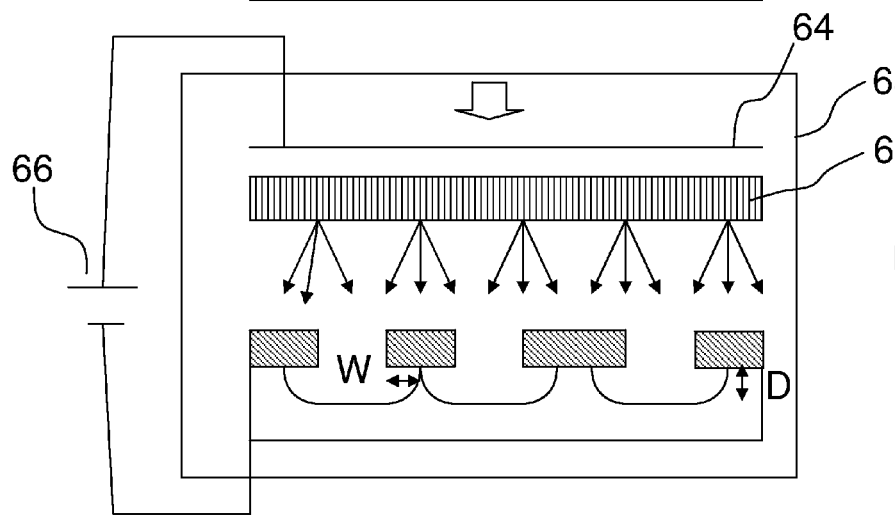
Figure 6D:
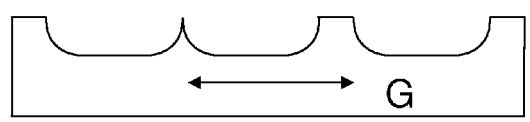
Figure 7A:
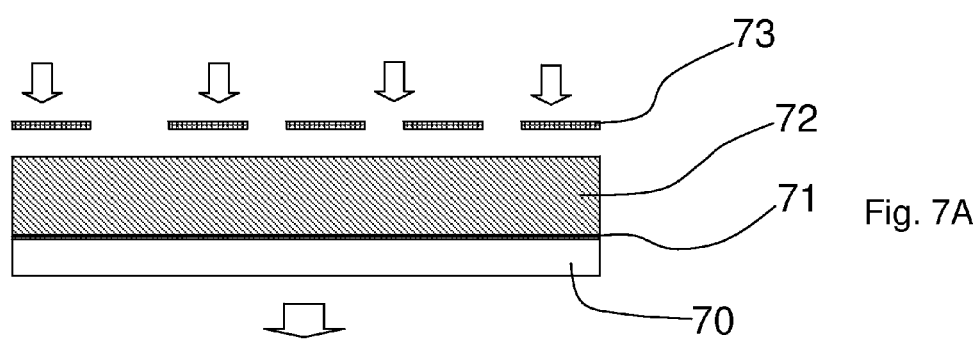
FIGS. 7A-7D depict a schematic representation of an additive electrodeposition process for obtaining a graded anode, according to an embodiment of the invention.
Figure 7B:
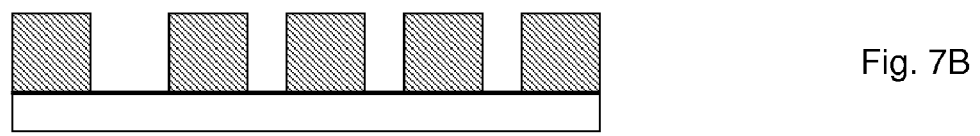
Figure 7C:
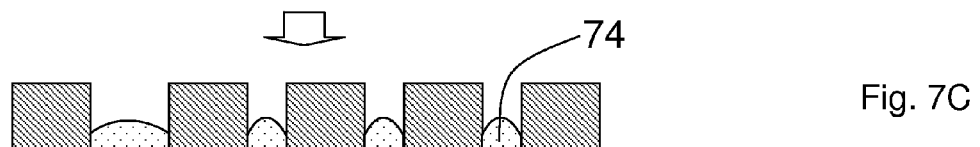
Figure 7D:
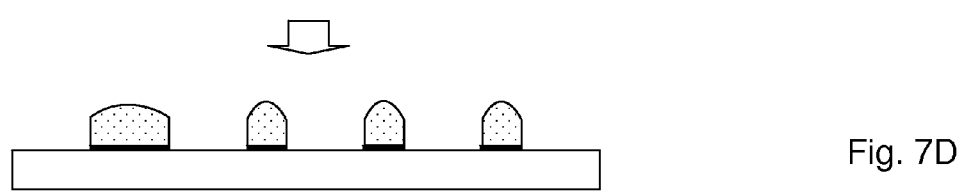
Figure 8A:
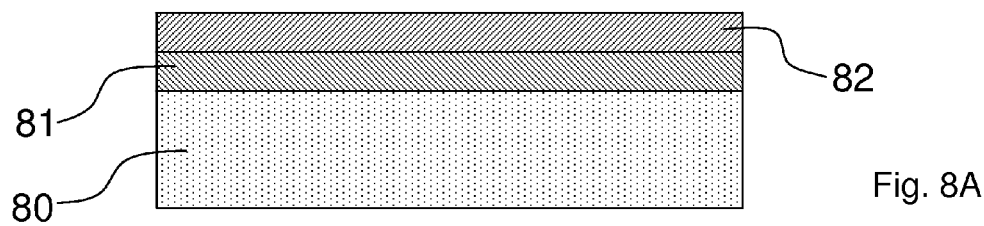
FIGS. 8A-8D depict a schematic representation of the formation of a semiconductor anode material by photo-electrochemical etch process, according to an embodiment of the invention.
Figure 8B:
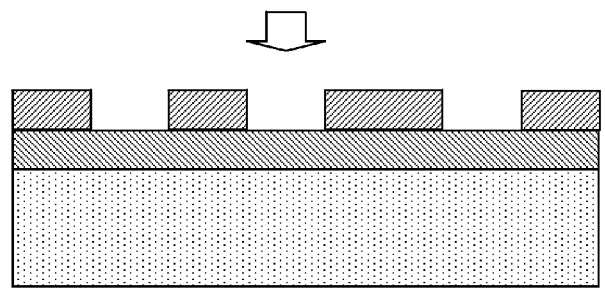
Figure 8C:
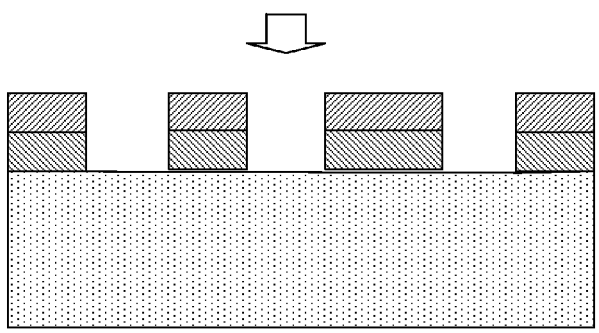
Figure 8D:
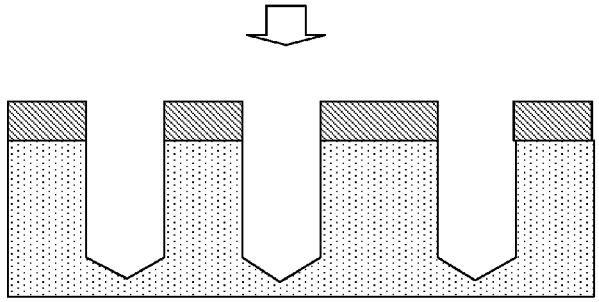
Figure 9A:
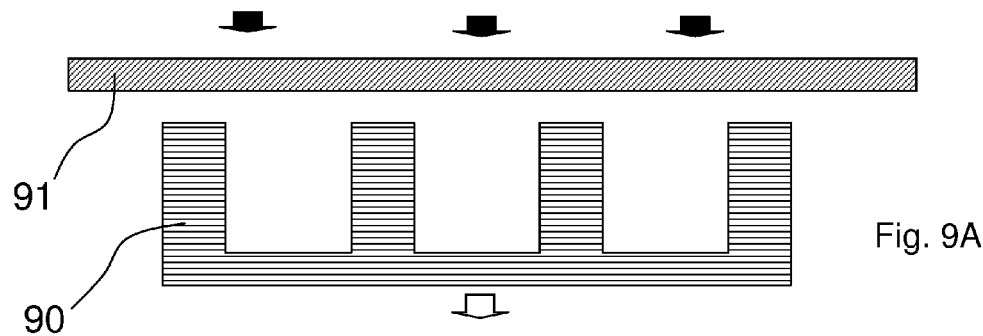
FIGS. 9A-9D depict a representation of a process for assembling a three-dimensional cell where a cathode and an anode are formed separately before being assembled together, according to an embodiment of the invention.
Figure 9B:
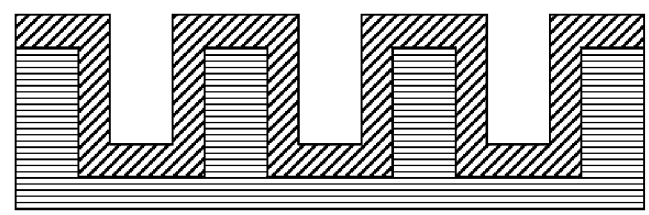
Figure 9C:
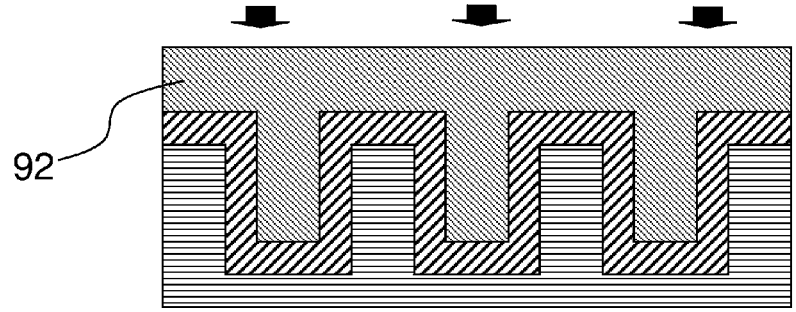
Figure 9D:
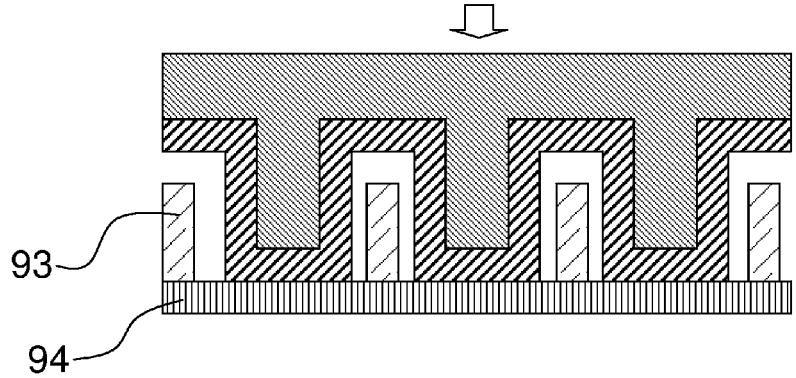

Several methods can be used to create and assemble a battery described herein. One way is for two electrodes to be structured separately before being assembled together. One such method of structuring an anode is shown in FIGS. 5A-5E. The method involves a process of reactively etching anode materials in areas that are to be removed with a halide plasma. This process works for a variety of solid anode materials that can be removed with reactive ion etching. For example, silicon can be patterned in this fashion using a fluoride plasma. As shown in FIG. 5A, the process involves starting with an anode substrate 50. A masking layer 51 is deposited on top of the substrate 50 by methods such as vacuum deposition, thermal oxidation, surface coating, and wet chemical deposition.

In case of silicon as the substrate 50, a thermally grown silicon dioxide layer of a particular thickness can serve as the masking layer 51. This layer 51 is subsequently patterned by standard patterning techniques such as lithography in order to provide a pattern suitable for further processing to create a graded anode structure. In some embodiments of the invention, the masking layer 51 is covered with a second masking layer 52 that is used to pattern the first masking layer 51. In this case, the first masking layer 51 is patterned by using the second masking layer 52 as a stencil (see FIGS. 5B-5C). For the silicon/silicon dioxide case, a standard photoresist can be used as the second masking layer 52. The second masking layer 52 can be patterned with standard optical lithography techniques. The second masking layer 52 is selectively removed using selective wet or dry methods, leaving behind the patterned first masking layer 51 (see FIG. 5D). This combination of the substrate 50 and the patterned first masking layer 51 is then subjected to a directional plasma 53 in a controlled environment in order to transfer the image of the first masking layer 51 onto the substrate 50 (also shown in FIG. 5D). This reactive etch process in the presence of a directional plasma source can provide excellent anisotropic etching of the substrate 50 while etching the masking layer 51 itself at a very low rate. After the reactive etch of the substrate 50 is complete, the masking layer 51 can be removed to leave the patterned substrate 50 behind, thereby forming the graded anode structure (see FIG. 5E).

The following example further explains concepts described with reference to FIGS. 5A-5E. Single crystal or polycrystalline silicon can be used as the anode substrate 50 that can be etched directionally in the presence of a plasma. The first masking layer 51 can be a thermally grown silicon dioxide layer of a particular thickness. A standard photoresist, such as AZ4620™ and AZP4620™ (commercially available from Clariant Corporation), can be used as the second masking layer 52. This layer 52 can be spin coated on top of the silicon dioxide layer, and subsequently patterned with standard optical lithography techniques. The areas of the AZ4620™ resist that are exposed to light can be developed away using a developer solution, such as AZ400K™ (commercially available from Clariant Corporation). This patterned structure is then dipped in a solution of HF, $NH_3F$, and water (Buffered Oxide Etch), wherein exposed silicon dioxide surfaces are dissolved. The remaining photoresist can be selectively removed by using a compatible organic solvent, such as N-methyl-2-Pyrrolidone, leaving behind the patterned silicon dioxide layer. This combination of the silicon and patterned silicon dioxide can then be subjected to a directional fluoride plasma source in order to etch an image of the silicon dioxide layer onto the substrate 50. The directionality of the plasma 53 is controlled by a bias voltage between an anode and a cathode in a conventional plasma reactive ion etcher. A difference in rate between etch of silicon and silicon dioxide causes a pattern to be transferred to the substrate 50 without much etching in a lateral direction. After the reactive etch of silicon is complete, the masking layer 51 can be removed by immersion in the Buffered Oxide Etch solution to leave the patterned substrate 50 behind.

FIGS. 6A-6D depict a schematic representation of a process for manufacturing an alloying anode using a subtractive electrochemical etch process. This process can be used for materials that can be etched in the presence of an electrical driving force. Materials that form alloy anodes such as aluminum, silicon, and tin can be patterned in this fashion. In this particular embodiment, an anode substrate 60 is patterned using an electrically insulating masking layer 61 that is deposited on top of the substrate 60 by methods such as vacuum deposition, thermal oxidation, surface coating, and wet chemical deposition. This layer 61 is subsequently patterned by standard patterning techniques such as lithography in order to provide a pattern suitable for further processing to create the anode. In some embodiments of the invention, the masking layer 61 is covered with a second masking layer 62 that is used to pattern the first masking layer 61 (see FIG. 6A). In this case, the first masking layer 61 is patterned by using the second masking layer 62 as a stencil. The second masking layer 62 is selectively removed using selective wet or dry methods, leaving behind the patterned first masking layer 61 (see FIG. 6B). The combination of the substrate 60 and the first masking layer 61 is placed in an electrochemical cell 63 that has a counter electrode 64 and a nozzle 65 that delivers a solution used to electrochemically remove a material in areas that are exposed to the solution (see FIG. 6C). In certain embodiments, the whole workpiece can be dipped into the solution that can dissolve the material that is in contact with the solution. However, the illustrated process can be more isotropic in nature, and typically an amount of material removed in the depth direction D can be substantially the same as the amount of material removed in each side of the width direction W. A dip-tank solution can be used for making features in which gaps G between neighboring anode structures are significantly narrower than the width W. A DC power source 66 is used to apply a potential that is sufficient to remove the material in contact with the solution. The process is complete when the desired amount of material is removed, which can be controlled based on the rate of etching that has been previously determined. In certain other cases, a current can be monitored, and a drop in the current can correspond to an end-point of the electrochemical reaction. After the reaction is substantially complete, the workpiece is removed, and the masking layer 61 can be removed to leave the patterned substrate 60 behind, thereby forming the anode (see FIG. 6D).

The following example further explains concepts described with reference to FIGS. 6A-6D. One example of the substrate 60 for electrochemical patterning is an aluminum sheet. A sheet of a desired thickness corresponding to an anode height can be used as the substrate 60, and is patterned using the electrically insulating masking layer 61 (e.g., commercially available photoresist AZ4620™ or AZP4620™) that is deposited on top of the substrate 60 by spin coating. This layer 61 can be exposed to light in the presence of a photomask that blocks light to areas in which the resist should be left behind. The workpiece is put into a solution that selectively removes the exposed areas. The combination of the substrate 60 and the first masking layer 61 is placed in the electrochemical cell 63 that has the counter electrode 64 (platinum) and the nozzle 65 that delivers the electrochemical etch solution used to electrochemically remove the metal in areas that are exposed to the solution. A solution containing 5 wt % potassium hydroxide can be delivered through the nozzle 65 to the workpiece. The DC power source 66 can be used to apply an anodic potential to the substrate 60, which removes aluminum in areas where the solution comes in contact with the aluminum anode and the platinum cathode at the same time, thereby forming a local electrochemical cell. After the reaction is substantially complete, the workpiece is removed, and the masking layer 61 is removed with N-methyl-2-pyrrolidone to leave the patterned substrate 60 behind.

In certain other embodiments of the invention, additive processes can be used to process electrodes of an energy storage device. FIGS. 7A-7D show a schematic representation of a process for manufacturing an anode using an additive electrochemical deposition process. This process can be referred to as a LIGA process, which stands for "lithography, galvano-forming and molding (Abformung)." In this process, a conductive or non-conductive substrate 70 is used. In case of a non-conducting substrate, a conducting layer 71 is deposited. Photoresist 72 is coated on top of this substrate 70, and is patterned by standard lithography techniques using a photomask 73 to leave behind the photoresist 72 in areas where an electrode material is not to be deposited (see FIGS. 7A and 7B). The workpiece is placed in an electroplating bath with a potential enough to reduce metallic ions present in solution to form a metal 74 (see FIG. 7C). The metallic ions are reduced at a conductive surface and are not deposited where the photoresist 72 is present. When the process is substantially complete, the workpiece including components 70, 72, and 74 is removed from a plating cell, and the photoresist 72 is removed to leave the electrode structure (including components 70 and 74) behind (see FIG. 7D).

The following example further explains concepts described with reference to FIGS. 7A-7D to produce a tin anode structure. In this process, a silicon wafer can be used as the semi-conductive substrate 70. Copper can be deposited using sputter deposition to create the conductive layer 71 on top of the silicon. A positive or negative tone photoresist 72 (e.g., AZ4620™ or AZP4620™) can be coated on top of this substrate 70 and is patterned by standard lithography techniques to leave behind the photoresist 72 in areas where an anode material is not to be deposited. This workpiece can be placed in a methane sulfonic acid-based tin electroplating bath along with a platinum counter electrode and a potential enough to reduce stannous ions present in the solution to tin metal 74. The metal ions are reduced at a conductive surface and are not deposited where the photoresist 72 is present. When the process is substantially complete, the workpiece including the silicon wafer 70, photoresist 72, and tin metal 74 can be removed. Subsequently, the photo resist 72 can be removed using N-methyl-2-pyrrolidone to leave a backbone structure of the silicon wafer 70, the copper seedlayer 71, and the tin metal 74 behind. The remaining copper metal in the area where the photoresist 72 was present can then be removed by a chemical etch involving 2% sulfuric acid and 1% hydrogen peroxide.

In the case where a material to be templated is semi-conductive, a process called photoelectrochemical etch can be used for patterning the material. For example, silicon is a material that can be patterned and used directly as an anode material. FIGS. 8A-8D shows a pictorial representation of a semiconductor patterning process for anodes in a lithium-ion battery. In the case of silicon, a silicon substrate 80 to be patterned can be a single crystal or polycrystalline and can be n-type or p-type. A first masking layer 81 can be deposited on top of the substrate 80. In case of silicon, the masking layer 81 can either be $SiO_2$ or $Si_3N_4$. This masking layer 81 can then be patterned using a standard lithographic process using a photoresist 82 as a template for etching the first masking layer 81 (see FIGS. 8A and 8B). After the image is transferred to the masking layer 81 (see FIG. 8C), the remaining photoresist can be removed before patterning the substrate 80. This combination of substrate 80 and masking layer 81 can then be immersed in an etch solution containing dilute HF (0.1-10 wt %) and ethanol (5-25 wt %), and an anodic potential can be applied in the presence of backside illumination 83 (see FIG. 8D). This backside illumination 83 can cause an excess of holes at a pit end of the substrate 80, thereby causing preferential anisotropic etching (see FIG. 8D). The resulting structured anode can then be used for assembly in a three-dimensional battery with a cathode and a separator having been separately formed using a process that produces a structured shape. Some examples of assembling the battery are explained below.

FIGS. 9A-9D depict a schematic representation of the assembly of a complete cell with a structured anode, a separator, and a cathode. Common cathode materials for lithium ion batteries include mixed metal oxide materials, such as $LiCoO_2$, or other oxides of Nickel, Cobalt, and Manganese. These oxides are typically in a powder form and are compacted into flat shapes along with conducting carbon particles and binders. The schematic example shown in FIGS. 9A-9D depict a methodology to compact a cathode material into a three-dimensional structured shape before assembling the anode. The process involves generating a mandrel 90 with the inverse shape of a cathode material shape (see FIG. 9A). This mandrel 90 can be made using conventional methodologies such as casting, extrusion, and so forth. The mandrel 90 can be made from metals, ceramics, plastics, and combinations thereof. A polymer material that acts as a separator 91 for the lithium-ion battery can be laid on top of the mandrel 90 and made into a conformal shape over the mandrel 90 with the assistance of a vacuum to remove air in channels. Due to vacuum application, the separator 91 can be conformally shaped on top of the mandrel 90 (see FIGS. 9A-9B). Once this is substantially complete, a cathode material slurry 92, which is typically in the form of cathode material oxides, conducting carbon, and binders, can be applied and vacuum-filled into trenches left behind by the mandrel 90 (see FIG. 9C). Since the separator 91 is a porous film, application of vacuum can force the cathode material slurry 92 to compact into the trenches in the mandrel 90. Once the cathode material slurry 92 and the separator 91 are substantially compacted, the mandrel 90 can be removed by either a mechanical or thermal release. In certain other embodiments, a cathode current collector can also be deposited or placed on top of the resulting cathode. The resulting cathode and separator 91 can be assembled along with an anode material 93 and an anode current collector 94 that has been formed separately using some of the concepts discussed herein (see FIG. 9D).

Due to expansion and contraction of an anode material that forms an alloy with lithium, it may be desirable to form gaps between a separator and the anode material. If the anode material is physically connected to the separator, repeated cycling of the anode material can mechanically deform the separator. In order to avoid this deformation, the separator can be conformally coated or assembled over a cathode material, rather than the anode material. The method explained earlier by way of FIGS. 8A-8D is one such methodology to conformally coat the separator over the cathode material while leaving gaps to allow anode expansion.

FIGS. 10A-10F show another example of a lithographically defined cathode material along with a deposited separator that is subsequently assembled into an anode structure that has been structured separately. The process involves taking a substrate 100 and depositing a conductive layer 101 on top by vacuum deposition or electroless deposition. Photoresist 102 is coated on top of this substrate 100 and is patterned by standard lithography techniques using a photo mask 103 to leave behind the photoresist 102 where an electrode material is not to be deposited (see FIGS. 10A-10B). This assembly is placed in an electroplating bath with a potential sufficient to reduce metallic ions present in solution to metal 104. The metal ions are reduced at a conductive surface and are not deposited where the photoresist 102 is present (see FIG. 10C). When the process is substantially complete, the workpiece including components 100, 102, and 104 is removed from a plating cell, and the photoresist 102 is removed to leave a cathode structure including components 100 and 104 behind (see FIG. 10D).

A separator film 105 can be deposited on the cathode structure using techniques for deposition of porous materials, such as spin or spray coating, physical or chemical vapor deposition, and electrophoretic deposition (see FIG. 10E). The thickness of the separator film 105 can be tailored according to specific process and specific parameters that are being used for deposition. A cathode 106 is then assembled on top of this structure to yield a battery (see FIG. 10F).

A variety of cathode materials that can be electrodeposited can be used for the techniques described earlier. These techniques can also be used to deposit materials electrophoretically or using techniques such as co-deposition, sol-gel deposition, and so forth. For example, in the case of a lithium-ion battery, a $LiCoO_2$, $LiNi_{0.5}Mn_{1.5}O_4$, or $V_2O_5$ cathode material can be electrophoretically deposited onto a conductive substrate. Cathode materials can also be co-deposited along with a polypyrrole matrix. In addition, certain cathode materials for lithium-ion batteries can be electrochemically deposited, such as molybdenum oxysulfides.

In some embodiments, a backbone structure is made out of a metal, semiconductor, organic, ceramic, or glass using a subtractive formation technique. These materials can be processed by reactively etching a substrate using a selective etch mask and a plasma etch process. Alternatively, or in conjunction, electrochemical etching, stamping, or electrical discharge machining can be used to selectively remove material preferentially in areas where these materials are not desired.

In certain embodiments, a backbone structure is made out of a metal, semiconductor, organic, ceramic, or glass using an additive formation technique. These materials can be processed by making a sacrificial mold using a technique such as conventional lithography, and depositing a backbone material using techniques such as electrochemical deposition, electroless deposition, electrophoretic deposition, vacuum assisted filling, stencil assisted filling, and so forth. In certain cases, the backbone structure can be assembled directly using a wirebonding process. In other cases, the backbone structure can be made on a flat plate using conventional lithography and deposition techniques, and subsequently assembled by "pick and place" and soldering or gluing techniques.

In certain embodiments, a backbone material can be shaped using printing techniques, such as three-dimensional printing and inkjet printing, to form a backbone structure using single or multiple layers of printing to obtain a desired shape and thickness. Alternatively, or in conjunction, the backbone material can be assembled in the form of layered sheets, with sacrificial layers deposited in between. After stacking of the sheets is substantially complete, a resulting structure may be cut into pieces of a desired height, assembled together, and the sacrificial material may be released to provide the backbone structure.

In the case of an electrically conductive backbone structure, an active material may be directly assembled on top of and around the backbone structure by various techniques, such as electrochemical deposition, electroless deposition, co-deposition in an organic or inorganic matrix, electrophoretic deposition, mechanical filling and compacting, and vacuum assisted flow deposition.

In case of an electrically non-conductive backbone structure, a conducting layer can be deposited by various techniques, such as electrochemical or electroless deposition, vapor assisted vacuum deposition such as Atomic Layer Deposition (ALD) and Chemical Vapor Deposition (CVD), sputter deposition, evaporation, and electrophoretic deposition. This conductive layer can be subsequently removed in order to remove an electrical connection between an anode and a cathode. This removal can be accomplished using techniques such as sputter etching, ion milling, and liftoff. In addition, techniques such as chemical dissolution can be used with standard techniques such as lithography to protect areas that do not need to be removed.

Some of the concepts outlined herein can be used to make two-dimensional as well as three-dimensional energy storage and retrieval systems and devices.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A three-dimensional lithium-ion battery comprising:
   a battery enclosure;
   an anode protruding from a surface of an anode substrate within said enclosure, said anode comprising a mass of anodically active material having a top, a bottom and sides extending continuously between the top and the bottom, the bottom being proximate the anode substrate surface, the top being distal to the anode substrate surface, the sides comprising a first and a second side, said anode having a first state and an expanded state that varies as a function of the state of charge of the three-dimensional battery, wherein the volume occupied by said anode is larger in said expanded state than in said first state;
   a first cathode and a second cathode protruding from a surface of a cathode substrate within the enclosure, the cathode substrate surface opposing the anode substrate surface or being the same surface as the anode substrate surface, the anode and the first and second cathodes being interdigitated such that the anode is between the first and second cathodes with the first cathode being separated from the first side of the anode along a first direction lying within a plane that is parallel to the anode substrate surface and the second cathode being separated from the second side of the anode along a second direction lying within a plane that is parallel to the anode substrate surface;
   a porous separator contacting said first and second cathodes, and surrounding the top and sides of said anode; and
   a gap between said anode and said porous separator, said gap being larger in said first state than in said expanded state as measured in the first and second directions, wherein the volume defined by said gap is at least twenty percent smaller in said expanded state than in said first state.

2. The three-dimensional battery of claim 1, wherein said anodically active material is capable of alloying with lithium.

3. The three-dimensional battery of claim 1, wherein said first direction and said second direction are between 150 degrees apart and 210 degrees apart within a plane that is parallel to the anode substrate surface.

4. The three-dimensional battery of claim 2, wherein said first direction and said second direction are between 150 degrees apart and 210 degrees apart within a plane that is parallel to the anode substrate surface.

5. The three-dimensional battery of claim 1, wherein said porous separator comprises a conformal coating over said first cathode and said second cathode.

6. The three-dimensional battery of claim 1, wherein said anodically active material is silicon.

7. The three-dimensional battery of claim 5, wherein said first direction and said second direction are between 150 degrees apart and 210 degrees apart within a plane that is parallel to the anode substrate surface.

8. The three-dimensional battery of claim 6, wherein said first direction and said second direction are between 150 degrees apart and 210 degrees apart within a plane that is parallel to the anode substrate surface.

9. The three-dimensional battery of claim 1 wherein the anode comprises an electrically conductive backbone and the anodically active material is between the electrically conductive backbone and the porous separator.

10. The three-dimensional battery of claim 1 wherein the anode comprises an electrically non-conductive backbone and the anodically active material is between the electrically non-conductive backbone and the porous separator.

11. The three-dimensional battery of claim 1 wherein the cathodes comprise an electrically conductive backbone and cathodically active material, the cathodically active material being between the electrically conductive backbone and the porous separator.

12. The three-dimensional battery of claim 1 wherein the cathodes comprise an electrically non-conductive backbone and cathodically active material, the cathodically active material being between the electrically non-conductive backbone and the porous separator.

13. The three-dimensional battery of claim 1 wherein the cathode substrate surface and the anode substrate surface are opposing surfaces.

14. The three-dimensional battery of claim 1 wherein the cathode substrate surface and the anode substrate surface are the same surface.

15. The three-dimensional battery of claim 1 wherein the battery comprises a plurality of anodes and a plurality of cathodes and the anodes and cathodes are in the shape of pillars.

16. The three-dimensional battery of claim 1 wherein the battery comprises a plurality of anodes and a plurality of cathodes and the anodes and cathodes are in the shape of bars.

17. The three-dimensional battery of claim 1 wherein the battery comprises a plurality of anodes and a plurality of cathodes and the anodes and cathodes have a circular shape.

18. The three-dimensional battery of claim 1 wherein the battery comprises a plurality of anodes and a plurality of cathodes and the anodes and cathodes have a wave shape.

19. The three-dimensional battery of claim 1 wherein said gap is between the porous separator and each of the first side, the second side and the top of the anode.

20. The three-dimensional battery of claim 1 wherein the porous separator contacts a portion of the mass of anodically active material.

21. The three-dimensional battery of claim 20, wherein said first direction and said second direction are between 150 degrees apart and 210 degrees apart within a plane that is parallel to the anode substrate surface.

22. The three-dimensional battery of claim 20, wherein said anodically active material is capable of alloying with lithium.

23. The three-dimensional battery of claim 22, wherein said first direction and said second direction are between 150 degrees apart and 210 degrees apart within a plane that is parallel to the anode substrate surface.

24. The three-dimensional battery of claim 22, wherein said porous separator comprises a conformal coating over said first cathode and said second cathode.

25. The three-dimensional battery of claim 20, wherein said anodically active material is silicon.

26. The three-dimensional battery of claim 1, wherein the porous separator contacts a portion of the mass of anodically active material, the first direction and said second direction are between 150 degrees apart and 210 degrees apart within a plane that is parallel to the anode substrate surface, and the volume defined by said gap is at least twenty percent smaller in said expanded state than in said first state.

27. The three-dimensional battery of claim 1, wherein the porous separator contacts a portion of the mass of anodically active material, the first direction and said second direction are between 150 degrees apart and 210 degrees apart within a plane that is parallel to the anode substrate surface, and the cathode substrate surface and the anode substrate surface are opposing surfaces.

28. The three-dimensional battery of claim 1, wherein the porous separator contacts a portion of the mass of anodically active material, the first direction and said second direction are between 150 degrees apart and 210 degrees apart within a plane that is parallel to the anode substrate surface, and the cathode substrate surface and the anode substrate surface are the same surfaces.

29. The three-dimensional battery of claim 1, wherein the porous separator contacts a portion of the mass of anodically active material, the first direction and said second direction are between 150 degrees apart and 210 degrees apart within a plane that is parallel to the anode substrate surface, the battery comprises a plurality of anodes and a plurality of cathodes, the plurality of anodes protrude from the anode substrate surface, the plurality of cathodes protrude from the cathode substrate surface, and the anode substrate surface and the cathode substrate surface are opposing surfaces.

30. The three-dimensional battery of claim 1, wherein the porous separator contacts a portion of the mass of anodically active material, the first direction and said second direction are between 150 degrees apart and 210 degrees apart within a plane that is parallel to the anode substrate surface, the battery comprises a plurality of anodes and a plurality of cathodes, the plurality of anodes protrude from the anode substrate surface, the plurality of cathodes protrude from the cathode substrate surface, and the anode substrate surface and the cathode substrate surface are the same surfaces.

* * * * *